United States Patent [19]

Walton et al.

[11] Patent Number: 4,487,891

[45] Date of Patent: Dec. 11, 1984

[54] THERMOPLASTIC POLYMER BLEND COMPOSITION AND MEMBRANE FORMED THEREFROM

[75] Inventors: Kim L. Walton, Baton Rouge, La.; Paul A. Pezzoli, Gahanna, Ohio

[73] Assignee: The Dow Chemical Company, Midland, Mich.

[21] Appl. No.: 577,640

[22] Filed: Feb. 6, 1984

[51] Int. Cl.$^3$ .................... C08L 23/28; C08L 31/04; C08L 23/08
[52] U.S. Cl. .................................... 525/222; 525/196
[58] Field of Search ........................... 525/192, 222

[56] References Cited

U.S. PATENT DOCUMENTS

| | | | |
|---|---|---|---|
| 3,676,391 | 7/1972 | DeRoss | 525/192 X |
| 3,806,676 | 1/1975 | Krackeler et al. | 525/222 X |
| 3,934,056 | 1/1976 | Yoshida et al. | 525/222 X |
| 3,960,986 | 6/1976 | Herchele et al. | 525/222 X |
| 4,309,332 | 1/1982 | Fischer et al. | 525/192 X |
| 4,354,003 | 10/1982 | Onodera et al. | 525/222 X |
| 4,361,237 | 11/1982 | Heiremans et al. | 525/222 X |

*Primary Examiner*—Carman J. Seccuro
*Attorney, Agent, or Firm*—D. R. Howard

[57] ABSTRACT

A blend of chlorinated polyethylene with two or more different ethylene/vinyl acetate copolymers is provided. The blend produces a membrane which is suitable for use in single-ply roofing applications. One ethylene/vinyl acetate copolymer has a polymerized vinyl acetate content of from about 38 to about 60 percent by weight of copolymer. A second ethylene/vinyl acetate copolymer has a polymerized vinyl acetate content of from about 13 to about 27 percent of weight of copolymer.

11 Claims, No Drawings

THERMOPLASTIC POLYMER BLEND COMPOSITION AND MEMBRANE FORMED THEREFROM

BACKGROUND OF THE INVENTION

The present invention relates generally to a thermoplastic polymer blend composition which contains an amount of a thermoplastic chlorinated polyethylene resin. The present invention also relates to a membrane formed from the polymer blend composition. The membrane is suitable for use in single-ply roofing applications.

Single-ply roofing membranes are suitably applied to a roofing structure as a plurality of strips rather than as a single large continuous membrane. A single large membrane would be difficult to manufacture and even more difficult to install.

Each strip is adhesively bonded to adjacent strips during installation to form a continuous membrane. In practice, there is a small overlap of one strip over an adjacent strip to facilitate bonding. The overlap is more commonly referred to as a seam. Adhesive bond strength of the seams is readily measured.

A single-ply roofing membrane, when installed on a roofing structure, is beneficially anchored to the roofing structure at several points thereof. In particular, the membrane is anchored to the edges of the roofing structure.

It has been found that single-ply roofing membranes experience a phenomenon known as "temperature induced load" during use, particularly in northern states. "Temperature induced load" is a measure of a force which a membrane exerts due to contraction upon being cooled from ambient temperatures of about 70° Fahrenheit (21° Centigrade) to subfreezing temperatures of about −30° Fahrenheit (−34° Centigrade).

Those skilled in the art will appreciate that "temperature induced load" is primarily dependent upon polymer composition of the membrane. They will also understand that "temperature induced load" may equal or exceed the adhesive bond strength of membrane seams.

When the temperature induced load exceeds bond strength of the seams of an anchored membrane, it follows that rupture of the seams may occur. Once the seams are ruptured, the membrane has a markedly reduced effectiveness.

In order to ensure membrane continuity, several possible solutions exist. One possible solution involves use of a stronger adhesive to increase bond strength of the seams. A second possible solution involves modification of membrane polymer composition to reduce temperature induced load. A third possible solution is a combination of the aforementioned solutions.

SUMMARY OF THE INVENTION

One aspect of the present invention is a polymer blend composition. The composition comprises three polymer components.

One polymer component is a thermoplastic chlorinated polyethylene resin. The chlorinated polyethylene resin has a chemically combined chlorine content of from about 24 to about 45 percent by weight of resin. The resin also has a melt viscosity of from about 7,000 to about 25,000 poise. The melt index is measured with a capillary rheometer which has a capillary size of 0.05 inches by 2 inches (0.13×5.08 centimeters). Melt index measurements are made at a temperature of 190° Centigrade and at a shear rate of 150 reciprocal seconds.

A second polymer component is a first elastomeric copolymer of ethylene. The copolymer has polymerized therein ethylene in an amount of from about 40 to about 62 percent by weight of polymer. The copolymer also has polymerized therein vinyl acetate in an amount of from about 38 to about 60 percent by weight of polymer.

The first copolymer of ethylene has two readily measurable physical properties. One physical property is a melt index of from about 0.1 to about 100 grams per 10 minutes. Melt Index is measured in accordance with American Society for Testing and Materials (hereinafter referred to as "ASTM") Test D-1238. A second physical property is a density of from about 0.96 to about 0.98 grams per cubic centimeter. Density is measured in accordance with ASTM Test D-792.

A third polymer component is a second elastomeric copolymer of ethylene. The copolymer has polymerized therein ethylene in an amount of from about 73 to about 87 percent by weight of polymer. The copolymer also has polymerized therein vinyl acetate in an amount of from about 13 to about 27 percent by weight of polymer.

The third polymer component, like the second polymer component, has two readily measurable physical properties. On physical property is a melt index (ASTM Test D-1238) of from about 0.1 to about 500 grams per 10 minutes. A second physical property is a density (ASTM Test D-792) of from about 0.93 to about 0.95 grams per cubic centimeter.

A second aspect of the present invention is a thermoplastic polymer membrane. The membrane is fabricated from the aforementioned polymer blend composition. The membrane has three readily measurable physical characteristics. One characteristic is temperature induced load. A second characteristic is seam strength. A third characteristic is blocking value. Techniques for measuring temperature induced load, seam strength and blocking value are set forth hereinafter in conjunction with working examples.

The thermoplastic polymer membrane suitably has a temperature induced load which is less than the seam strength thereof. The seam strength is suitably greater than about eight pounds per inch (9.2 kilograms per centimeter) width. Beneficial results are obtained when the temperature induced load is less than both (a) the seam strength and (b) ten pounds per inch (11.5 kilograms per centimeter) width.

The thermoplastic polymer membrane suitably has a seam strength which is greater than the temperature induced load of the membrane. Particularly beneficial results are obtained when the seam strength is greater than both (a) the temperature induced load and (b) fifteen pounds per inch (17.25 kilograms per centimeter) width. Acceptable results are obtained, however, at seam strengths of from about seven to about fifteen pounds per inch (8.05 to 17.25 kilograms per centimeter) width provided the seam strength exceeds the temperature induced load by at least one pound per inch (1.15 kilograms per centimeter) width.

The thermoplastic membrane suitably has a blocking value of less than about one pound per inch (1.15 kilograms per centimeter) width. A blocking value of greater than about one per inch (1.15 kilograms per centimeter) width is undesirable because membranes

DESCRIPTION OF THE PREFERRED EMBODIMENTS

The chlorinated polyethylene resins which are suitable for purposes of the present invention must, as a minimum, meet two physical property criteria. First, the resins must have a chemically combined chlorine content of from about 24 to about 45 percent by weight of polymer. Second, the resins must have a melt viscosity of from about 7,000 to about 25,000 poise. Melt viscosity is measured with a capillary rheometer (capillary size 0.05×2 inches (0.13×5.08 centimeters)) at a temperature of 190° Centigrade and a shear rate of 150 reciprocal seconds.

The chlorinated polyethylene resins are prepared by chlorination of essentially linear, finely-divided polyethylene or olefin interpolymers containing at least about 90 mole percent of ethylene in the interpolymer molecule. The olefin interpolymers also contain a total amount of up to about 10 mole percent of one or more ethylenically unsaturated monomers copolymerizable with ethylene.

The polymers, prior to chlorination, suitably have a weight average molecular weight of less than about 1,000,000 grams per mole, beneficially between about 20,000 and 300,000 grams per mole.

The polymers are suitably prepared under the influence of catalyst systems comprising admixtures of strong reducing agents, such as triethyl aluminum, and compounds of groups IV-B, V-B and VI-b metals of the Periodic System, such as titanium tetra-chloride, and the like.

Useful ethylenically unsaturated monomers include non-aromatic hydrocarbon olefins having 3 or more carbon atoms such as propylene, butene-1, octene 1,7-octadiene and the like; substituted olefins such as acrylic acid, acrylic acid esters and the like; alkenyl aromatic compounds such as styrene and its derivatives, and other known polymerizable materials.

Chlorinated polyethylene resins suitable for use with the present invention are prepared by suspension chlorination as disclosed in U.S. Pat. No. 3,454,544, the teachings of which are incorporated herein by reference thereto.

The present invention is not restricted to chlorinated polyethylene resins prepared by suspension or slurry chlorination procedures. Solution chlorination and bulk, or fluidized bed, chlorination procedures may also be used provided the polymers produced thereby meet the aforementioned requirements with regard to chlorine content and melt viscosity.

The second and third polymer components of the polymer blend composition are copolymers of ethylene and at least one monomer copolymerizable therewith. The monomer is selected from the group consisting of (a) vinyl esters of saturated carboxylic acids, wherein the acid moiety has up to four carbon atoms, (b) unsaturated mono- or dicarboxylic acids of three to five carbon atoms, and (c) esters of said unsaturated acids wherein the alcohol moiety has one to eight carbon atoms.

The second polymer component suitably has polymerized therein (a) ethylene in an amount of from about 40 to about 62 percent by weight of polymer and (b) vinyl acetate in an amount of from about 38 to about 60 percent by weight of polymer. The second polymer component desirably has polymerized therein ethylene in an amount of from about 44 to about 56 percent by weight of polymer and vinyl acetate in an amount of from about 44 to about 56 percent by weight of polymer. The second polymer component has a density (ASTM Test D-792) of from about 0.96 to about 0.98 grams per cubic centimeter. The second polymer component also has a melt index (ASTM Test D-1238) of from about 0.1 to about 100 grams per 10 minutes.

The third polymer component suitably has polymerized therein (a) ethylene in an amount of from about 73 to about 87 percent by weight of polymer and (b) vinyl acetate in an amount of from about 13 to about 27 percent by weight of polymer. The third polymer component desirably has polymerized there ethylene in an amount of from about 75 to about 85 percent by weight of polymer and vinyl acetate in an amount of from about 15 to about 25 percent by weight of polymer. The third polymer component has a density (ASTM Test D-792) of from about 0.93 to about 0.95 grams per cubic centimeter. The third polymer component also has a melt index (ASTM Test D-1238) of from about 0.1 to about 500 grams per 10 minutes.

It has been found that when the vinyl acetate content of the third polymer component is either greater than about 28 or less than about 12 percent by weight of polymer, the polymer blend composition has an undesirably high blocking value.

The polymer components of the polymer blend are suitably present in the following amounts, based upon 100 parts by weight of polymer blend: (a) chlorinated polyethylene resin—from about 65 to about 75 parts by weight; (b) first elastomeric copolymer of ethylene—from about 10 to about 25 parts by weight; and (c) second elastomeric copolymer of ethylene—from about 15 to about 25 parts by weight. Membranes formed from similar polymer blends which have greater than about 25 parts by weight of the first elastomeric copolymer of ethylene are unsuitable because of excessive blocking.

The polymer components of the polymer blend are beneficially present in the following amounts, based upon 100 parts by weight of polymer blend: (a) chlorinated polyethylene resin—from about 68 to about 72 parts by weight; (b) first elastomeric copolymer of ethylene—from about 12 to about 18 parts by weight; and (c) second elastomeric copolymer of ethylene—from about 12 to about 18 parts by weight. Membranes formed from these polymer blends generally have (a) solvent seam strengths in excess of about 15 pounds per inch (17.25 kilograms per centimeter) width, (b) temperature induced loads of less than about 10 pounds per inch (11.5 kilograms per centimeter) width and (c) blocking values of less than about one pound per inch (1.15 kilograms per centimeter) width.

The polymer blend composition may be combined with other components such as fillers, pigments, stabilizers, processing aids and the like. Amounts and types of "other components" will vary depending upon factors such as cost and effect upon composition properties.

Fillers which may be used in compositions of the present invention are finely-divided, inorganic materials of natural or synthetic origin in the form of regular or irregular particles, platelets or fibrous pieces. Suitable materials include various types and grade of calcium carbonate (whiting), calcium sulfate, mica, talc, kaolin and other clay minerals, silicates, silica, barytes, magnesium oxide, magnesium carbonate, aluminum trihydrate and the like, and mixtures of such fillers. The fillers are suitably of a fineness sufficient to pass through a 100-mesh screen sieve (U.S. Standard Sieve Series). The fillers beneficially have equivalent spherical diameter less than about 15 microns.

The fillers are suitably present in an amount of from about 10 to about 80 parts per hundred parts by weight of polymer blend composition. The fillers are desirably present in an amount of from about 10 to about 50 parts per hundred parts by weight of polymer blend composition.

Organic and mineral pigments which may be used in combination with the polymer blend composition include, for example, carbon black, titanium dioxide, iron oxide and the like as well as mixtures thereof. The pigments are suitably present in an amount of from about 2 to about 50 parts per hundred parts by weight of polymer blend composition. The pigments are desirably present in an amount of from about 10 to about 40 parts per hundred parts by weight of polymer blend composition.

Stabilizers are normally included in compositions of the present invention to protect the chlorinated polyethylene resin against possible decomposition by heat of processing, etc. Stabilizers conventionally used in preparation of vinyl polymer and copolymer sheet compositions are generally suitable. Examples include organic complexes, oxides and/or salts of lead, tin, barium, cadmium, magnesium, sodium, etc. Specific examples include dibasic lead phthalate, dibasic lead phosphate, lead oxide, magnesium oxide, sodium phosphate, magnesium carbonate, barium-cadmium stearate and the like. Small quantities of such stabilizers are generally effective. Two to 20 parts of stabilizer per 100 parts of chlorinated polyethylene are generally suitable.

If desired, small amounts of antioxidants such as the hindered phenols, e.g., di-t-butyl-p-cresol, and processing aids such as stearic acid, waxes, etc., may be incorporated into compositions of the present invention thereby obtaining further improved milling and calendaring characteristics.

Thermoplastic polymer blends of the present invention are suitably mixed by a heated two roll mill, a Banbury type mixer or equivalent mixing and compounding equipment.

The following examples are only for purposes of illustration and are not to be viewed as limiting the present invention. All parts and percentages are on a weight basis unless otherwise stated.

EXAMPLE 1

Polymer Blend Composition Representative of the Present Invention

A physical blend was prepared from the following components:

(a) 70 parts of a chlorinated polyethylene resin having (1) a chemically combined chlorine content of 42 percent, and (2) a melt viscosity of 18,500 poise. Melt viscosity was measured using a capillary rheometer (capillary size of 0.05×2 inches (0.13×5.08 centimeters)) at a temperature of 190° Centigrade and at a shear rate of 150 reciprocal seconds. The resin was commercially available from The Dow Chemical Company under the trade designation CPE 4213.

(b) 13 parts of an ethylene/vinyl acetate copolymer having (1) a polymerized vinyl acetate content of 40 percent, (2) a melt index (ASTM Test D-1238) of 57 grams per 10 minutes, and (3) a density (ASTM Test D-792) of 0.965 grams per cubic centimeter. The copolymer was commercially available from E. I. du Pont de Nemours & Co. under the trade designation Elvax TM 40-P.

(c) 17 parts of an ethylene/vinyl acetate copolymer having (1) a polymerized vinyl acetate content of 18 percent, (2) a melt index (ASTM Test D-1238) of 2.5 grams per 10 minutes, and (3) a density (ASTM Test D-792) of 0.941 grams per cubic centimeter. The copolymer was commercially available from E. I. du Pont de Nemours & Co. under the trade designation Elvax TM 460.

(d) 2 parts of a sodium-barium organophosphate ultraviolet light stabilizer commercially available from Ferro Corp., Chemical Division, under the trade designation UV Chek AM 595.

(e) 4 parts of epoxidized soybean oil.

(f) 1.5 parts of an oxidized polyethylene wax commercially available from Allied Chemical Company under the trade designation 692A wax.

(g) 0.8 parts of stearic acid.

(h) 30 parts of talc.

(i) 1.5 parts of an ester antioxidant commercially available from Carstab Corp. under the trade designation Carstab DLTDP.

(j) 25 parts of titanium dioxide commercially available from E. I. du Pont de Nemours & Co. under the trade designation R-960.

(k) 0.5 parts of an alkylated phenol antioxidant commercially available from Ciba-Geigy Corp. under the trade designation Irganox TM 1076.

The physical blend was converted to a fused mixture using a two roll plastic compounding mill. The two roll mill had a set roll temperature of 250° Fahrenheit (121° Centigrade). The fused mixture was then further processed on the same two roll mill at the same set temperature for an additional five minutes. The further processed fused mixture was removed from the two roll mill in the form of a smooth heat plastified sheet. The sheet had a thickness of 80–90 mils (0.20–0.23 centimeters).

Pieces of the sheet were compression molded to form samples having a thickness of about 40 mils (0.10 centimeters). Compression molding was accomplished in the following sequential manner using a hydraulic press:

(a) heating at a temperature of 250° Fahrenheit (121° Centigrade) and at a force of 5,000 pounds per square inch (34,500 kilopascals) gauge (psig) for a period of 3 minutes;

(b) heating at the same temperature but at a force of 20,000 psig (138,000 kilopascals) for a period of 3 minutes; and (b) cooling by circulating ambient water (about 70° Fahrenheit or about 21° Centigrade) through the press while maintaining the force at 20,000 psig (138,000 kilopascals) for a period of 3 minutes. Test bar specimens were cut from the samples so prepared for testing as hereinafter set forth.

Comparative Examples A-E in Which Types and Amounts of Polymer Components Were Varied A series of physical blends were prepared, compounded and converted to compression molded samples using the same procedures and equipment as in Example 1. Components (d) through (k) were used in the same amounts in this series of physical blends as in Example 1. Component (a), the chlorinated polyethylene resin of Example 1 (hereinafter designated as CPE-1) was used in varying amounts for Comparative Examples A-E. The amount and/or type of ethylene/vinyl acetate copolymer used for Comparative Examples A-E differed from that used in Example 1.

Component (b) of Example 1 is hereinafter designated as EVA-1. Component (c) of Example 1 is hereinafter designated as EVA-2.

EVA-3 is an ethylene/vinyl acetate copolymer having (1) a polymerized vinyl acetate content of 28 percent, (2) a melt index (ASTM Test D-1238) of 6.0 grams per 10 minutes, and (3) a density (ASTM Test D-792) of 0.955 grams per cubic centimeter. EVA-3 designates an ethylene/vinyl acetate copolymer which was commercially available from E. I. du Pont de Nemours & Co. under the trade designation Elvax TM 260.

EVA-4 is an ethylene/vinyl acetate copolymer having (1) a polymerized vinyl acetate content of 51 percent, (2) a melt index (ASTM Test D-1238) of 18 grams per 10 minutes, and (3) a density (ASTM Test D-792) of 0.98 grams per cubic centimeter. EVA-4 designates an ethylene/vinyl acetate copolymer which was commercially available from U.S. Industrial Chemicals Co., Division of National Distillers & Chemical Corp. under the trade designation Vynathene ®EY 905-25.

The amount and type of chlorinated polyethylene resin and ethylene/vinyl acetate resin used in Example 1 and in Comparative Examples A-E is set forth in Table I which follows. The other components are not listed because they are identical for each of the physical blends.

TABLE I

| Example/ Comparative Example | Polymer Composition (Parts By Weight) |  |  |  |  |
|---|---|---|---|---|---|
| | Polymer Compounds |  |  |  |  |
| | CPE-1 | EVA-1 | EVA-2 | EVA-3 | EVA-4 |
| 1 | 70 | 13 | 17 | — | — |
| A | 80 | 20 | — | — | — |
| B | 80 | — | 20 | — | — |
| C | 80 | — | — | 20 | — |
| D | 80 | — | — | — | 20 |
| E | 70 | 10 | — | 20 | — |

Physical Property Test Evaluation of Test Bar Samples Prepared in Example 1 and Comparative Examples A-E Blocking Test Two test bar specimens (strips) measuring two inches by six inches (5.08 centimeters by 15.24 centimeters) are used for this test. The strips are laid flat in a forced air convection oven with one strip being superimposed on the other strip. The oven has a set temperature of 170° Fahrenheit (77° Centigrade). A block measuring two inches by two inches (5.08 centimeters by 5.08 centimeters) and weighing four pounds (1.82 kilograms) is placed on top of one end of the strips so that it covers an area of two inches by two inches (5.08 centimeters by 5.08 centimeters). With the block in place, the strips are left in the oven for a period of 24 hours at the set temperature.

After the period of 24 hours, the block is removed from the strips and the strips are removed from the oven. The strips are then transferred to a cooling chamber wherein ASTM standard conditions are maintained. ASTM standard conditions are 23±2° Centigrade and 50 ±5% humidity. The strips are left in the cooling chamber for a period of 24 hours.

After being cooled for the period of 24 hours, the strips are removed from the cooling chamber. The ends of the strips opposite the ends upon which the block was placed are placed in the jaws of a tensile testing machine (90° peel) and pulled apart a rate of five inches per minute. If some fusion has occurred, a measurable force per inch width of peel is observed. This force is called "Blocking Value".

Solvent Seam Strength Test

Two test bar specimens (strips) measuring two inches by six inches (5.08 centimetes by 15.24 centimeters) are used for the test. One side of each of the two strips is brushed with tetrahydrofuran solvent. One strip is superimposed upon the other strip in such a manner that (a) the solvent coated sides are in contact with each other and (b) an end of each of the strips is kept from contacting the other strip by interposing a piece of polyethylene film between the strips. The piece of film measures two inches by two inches (5.08 centimeters by 5.08 centimeters). The piece of film has a thickness of about 3 mils (0.01 centimeter). The strips are then pressed by passing a one-pound (0.39 kilogram) roller over them two times.

The pressed strips are allowed to dry in the cooling chamber under ASTM standard conditions for a period of 24 hours. The cooling chamber and the ASTM standard conditions are described hereinabove with respect to the Blocking Test.

After drying, the strips are removed from the chamber. The ends of the strips which were not in contact with such other are placed in the jaws of a tensile testing machine (90° peel) and pulled apart at a rate of five inches (12.7 centimeters) per minute. Where bonding between the strips has occurred, a measurable seam strength in pounds per inch (kilograms per centimeter) width is observed. This force is called "Seam Strength".

Temperature Induced Load Test

A test bar specimen (strip) measuring one inch by three and one-half inches (2.54 centimeters by 8.89 centimeters) is used for this test. The strip is first conditioned for a period of 24 hours in the cooling chamber under ASTM standard conditions. The cooling chamber and the ASTM standards conditions are described hereinabove with respect to the blocking test. The strip is then removed from the cooling chamber and placed in the jaws of a tensile testing apparatus which is equipped with an environmental chamber capable of cooling to a temperature of −30° Fahrenheit (−34° Centigrade).

The tensile testing apparatus is adjusted so that a force of zero pounds per inch (kilograms per centimeter) is applied to the test strip at a temperature of 70° Fahrenheit (21° Centigrade). The environmental chamber is then cooled to a temperature of −30° Fahrenheit (−34° Centigrade). When the test strip contracts upon cooling, a measurable force is observed. This measurable force is in units of pounds per inch (kilograms per centimeter) width and is called "Temperature Induced Load".

Test bar specimens, prepared as detailed hereinabove for Example 1 and Comparative Examples A-E, were subjected to physical property testing, also as detailed hereinabove. Results of the physical property testing are summarized in Table II.

TABLE II

Physical Property Test Results

| Example/Comparative Example No. | Seam Strength Pounds per inch | Seam Strength Kilograms per centimeter | Temperature Induced Load Pounds per inch | Temperature Induced Load Kilograms per centimeter | Blocking Pounds per inch | Blocking Kilograms per centimeter |
|---|---|---|---|---|---|---|
| 1 | 9.5 | 10.9 | 7.9 | 9.1 | 0.8 | 0.9 |
| A | 18.5 | 21.3 | 10.8 | 12.4 | 7.5 | 8.6 |
| B | 0.2 | 0.2 | 13.1 | 15.1 | 0.2 | 0.2 |
| C | 1.3 | 1.5 | 12.5 | 14.4 | 1.3 | 1.5 |
| D | 1.3 | 1.5 | 4.33 | 5.0 | 13 | 15.0 |
| E | 0.65 | 0.7 | 13.2 | 15.2 | 0.6 | 0.7 |

It is clear, from the results presented in Table II, that only the polymer blend composition of Example 1 has an acceptable combination of seam strength, temperature induced load and blocking. The polymer blend composition of Comparative Examples A and D have acceptable seam strength and temperature induced load. These compositions are, however, excessively tacky as shown by the blocking value. The polymer blend compositions of Comparative Examples B, C and E have temperature induced load values which are undesirably high.

Acceptable combinations of seam strength, temperature induced load and blocking are obtained with other polymer blend compositions which are representative of the present invention.

Examples 2 and 3 and Comparative Examples F, G and H

Polymer Blend Compositions with Varying Amounts of Polymer Components

A series of physical blends were prepared, compounded and converted to compression molded samples using the same procedures and equipment as in Example 1. Components (d) through (k) were used in the same amounts in this series of physical blends as in Example 1. Component (a), the chlorinated polyethylene resin (CPE-1) was used in varying amounts as shown in Table III which follows. Component (c), also known as EVA-2, was used in varying amounts which are shown in Table III. Component (b), changed by substituting EVA-4 for EVA-1, was also used in varying amounts as shown in Table III.

TABLE III

Parts of Polymer Components of Physical Blend Compositions

| Component | Example/Comparative Example 2 | 3 | F | G | H |
|---|---|---|---|---|---|
| CPE-1 | 70 | 70 | 80 | 70 | 55 |
| EVA-2 | 10 | 20 | 5 | 25 | 15 |
| EVA-4 | 20 | 10 | 15 | 5 | 30 |

Test bar specimens or strips were prepared from the physical blend compositions of Examples 2 and 3 and Comparative Examples F, G and H using the procedures set forth hereinabove for Example 1. The strips were subjected to physical property tests to determine temperature induced load, seam strength and blocking value.

Physical property test results are summarized in Table IV.

TABLE IV

Physical Property Test Results

| Example/Comparative Example No. | Temperature Induced Load Pounds per inch | Temperature Induced Load Kilograms per centimeter | Seam Strength Pounds per inch | Seam Strength Kilograms per centimeter | Blocking Pounds per inch | Blocking Kilograms per centimeter |
|---|---|---|---|---|---|---|
| 2 | 3.9 | 4.5 | 19 | 21.8 | 0.8 | 0.9 |
| 3 | 7.3 | 8.4 | 8.5 | 9.8 | 0.1 | 0.1 |
| F | 3.2 | 3.7 | 20 | 23 | 25 | 28.8 |
| G | 9.9 | 11.4 | 4.5 | 5.2 | 0.6 | 0.7 |
| H | 3.5 | 4.0 | 11.5 | 13.2 | 11.3 | 13.0 |

The physical property test results presented in Table IV are instructive. The compositions of Examples 2 and 3 produce acceptable combinations of temperature induced load, seam strength and blocking. The composition of Example 3 has a relatively low seam strength. The seam strength is, however, acceptable because it exceeds temperature induced load by more than one pound per inch (1.15 kilogram per centimeter). The compositions of Comparative Examples F and H are unsuitable because they have unacceptably high blocking values. The composition of Comparative Example G is unsuitable because it has a temperature induced load which is more than double its seam strength.

Results similar to those obtained with Example 2 are obtained with other polymer blend compositions which are representative of the present invention.

Example 4 and Comparative Examples I, J and K

Polymer Blend Compositions Wherein Only Vinyl Acetate Content of Ethylene/Vinyl Acetate Copolymers is Varied Test bar specimens (strips) were prepared from polymer blend compositions which are set forth in Table V using the same procedures and equipment as set forth in Example 1. Components (a) and (d) through (k) were the same as in Example 1. Two additional ethylene/vinyl acetate copolymers were evaluated.

EVA-5 was an ethylene/vinyl acetate copolymer having (1) a polymerized vinyl acetate content of 9 percent, (2) a melt index (ASTM Test D-1238) of 0.8 grams per ten minutes, and (3) a density (ASTM Test D-792) of 0.930 grams per cubic centimeter. The copolymer was commercially available from E. I. du Pont de Nemours & Co. under the trade designation Elvax TM 770.

EVA-6 was an ethylene/vinyl acetate copolymer having (1) a polymerized vinyl acetate content of 12 percent, (2) a melt index (ASTM Test D-1238) of 0.3 grams per ten minutes, and (3) a density (ASTM Test D-792) of 0.933 grams per cubic centimeter. The copolymer was commercially available from E. I. du Pont de Nemours & Co. under the trade designation Elvax TM 670.

Polymer components of the polymer blend compositions and blocking values obtained from test bar specimens formed therefrom are set forth in Table V.

TABLE V

Polymer Composition & Blocking Value - Vinyl Acetate Content Variation

| Component | Vinyl Acetate Content | Example/Comparative Example | | | |
|---|---|---|---|---|---|
| | | 4 | I | J | K |
| CPE-1 | — | 70 | 70 | 70 | 70 |
| EVA-2 | 18 | 10 | | | |
| EVA-3 | 28 | | | | 10 |
| EVA-4 | 51 | 20 | 20 | 20 | 20 |
| EVA-5 | 9 | | 10 | | |
| EVA-6 | 12 | | | 10 | |
| | | Blocking Value | | | |
| pounds per inch | | 0.8 | 11.5 | 3.0 | 1.0 |
| kilograms per centimeter | | 0.9 | 13.2 | 3.4 | 1.2 |

The blocking values set forth in Table V demonstrate the criticality of vinyl acetate content. A blocking value of 1.0 pounds per inch (1.15 kilograms per centimeter) width or more is undesirable because of handling difficulties.

Results similar to those obtained with Example 4 are obtained with other polymer blend compositions which are representative of the present invention.

What is claimed is:

1. A polymer blend composition, the composition comprising:
   (A) a thermoplastic chlorinated polyethylene resin, the resin having
      (1) a chemically combined chlorine content of from about 24 to about 45 percent by weight of resin and
      (2) a melt viscosity, as measured with a capillary rheometer having a capillary size of 0.05 inches by 2 inches (0.13 by 5.08 centimeters) at a temperature of 190° Centigrade and a shear rate of 150 reciprocal seconds of from about 7,000 to about 25,000 poise;
   (B) a first elastomeric copolymer of ethylene, the copolymer having polymerized therein ethylene in an amount of from about 40 to about 62 percent by weight of polymer and vinyl acetate in an amount of from about 38 to about 60 percent by weight of polymer, the copolymer also having
      (1) a melt index, as measured in accordance with American Society for Testing and Materials Test D-1238, of from about 0.1 to about 100 grams per 10 minutes and
      (2) a density, as measured in accordance with American Society for Testing and Materials Test D-792, of from about 0.96 to about 0.98 grams per cubic centimeter; and
   (c) a second elastomeric copolymer of ethylene, the copolymer having polymerized therein ethylene in an amount of from about 73 to about 87 percent by weight of polymer and vinyl acetate in an amount of from about 13 to about 27 percent by weight of polymer, the copolymer also having
      (1) a melt index, as measured in accordance with American Society for Testing and Materials Test D-1238, of from about 0.1 to about 500 grams per 10 minutes, and
      (2) a density, as measured in accordance with American Society for Testing and Materials Test D-792, of from about 0.93 to about 0.95 grams per cubic centimeter.

2. The polymer blend composition of claim 1 wherein (a) the chlorinated polyethylene resin is present in an amount of from about 65 to about 75 parts per 100 parts of polymer blend composition, (b) the first elastomeric copolymer of ethylene is present in an amount of from about 10 to about 25 parts per 100 parts of polymer blend composition and (c) the second elastomeric copolymer of ethylene is present in an amount of from about 15 to about 25 parts per 100 parts of polymer blend composition.

3. The polymer blend composition of claim 1 wherein (a) the chlorinated polyethylene resin is present in an amount of from about 68 to about 72 parts per hundred parts of polymer blend composition, (b) the first elastomeric copolymer of ethylene is present in an amount of from about 12 to about 18 parts per hundred parts of polymer blend composition and (c) the second elastomeric copolymer of ethylene is present in an amount of from about 12 to about 18 parts per hundred parts of polymer blend composition.

4. The polymer blend composition of claim 1 wherein the first elastomeric copolymer of ethylene has polymerized therein ethylene in an amount of from about 49 to about 60 percent by weight of polymer and vinyl acetate in an amount of from about 40 to about 51 percent by weight of polymer.

5. The polymer blend composition of claim 1 wherein the second elastomeric copolymer of ethylene has polymerized therein ethylene in an amount of from about 75 to about 85 percent by weight of polymer and vinyl acetate in an amount of from about 15 to about 25 percent by weight of polymer.

6. A thermoplastic polymer membrane, the membrane being fabricated from a polymer blend composition which comprises:
   (A) a thermoplastic chlorinated polyethylene resin, the resin having
      (1) a chemically combined chlorine content of from about 24 to about 45 percent by weight of resin, and
      (2) a melt viscosity, as measured with a capillary rheometer having a capillary size of 0.05 inches by 2 inches (0.13 by 5.08 centimeters) at a temperature of 190° Centigrade and a shear rate of 150 reciprocal seconds of from about 7,000 to about 25,000 poise;
   (B) a first elastomeric copolymer of ethylene, the copolymer having polymerized therein ethylene in an amount of from about 40 to about 62 percent by weight of polymer and vinyl acetate in an amount of from about 38 to about 60 percent by weight of polymer, the copolymer also having
      (1) a melt index, as measured in accordance with American Society for Testing and Materials Test D-1238, of from about 0.1 to about 100 grams per 10 minutes, and
      (2) a density, as measured in accordance with American Society for Testing and Materials Test D-792, of from about 0.96 to about 0.98 grams per cubic centimeter; and
   (C) a second elastomeric copolymer of ethylene, the copolymer having polymerized therein ethylene in an amount of from about 73 to about 87 percent by weight of polymer and vinyl acetate in an amount of from about 13 to about 27 percent by weight of polymer, the copolymer also having
      (1) a melt index, as measured in accordance with American Society for Testing and Materials Test D-1238, of from about 0.1 to about 500 grams per 10 minutes, and (2) a density, as measured in accordance with American Society for Testing and Materials Test D-792, of from about 0.93 to about 0.95 grams per cubic centimeter, the polymer membrane having a blocking value, a temperature induced load and a seam strength, the blocking value being less than one pound per inch (1.15 kilograms per centimeter) width and the temperature induced load being at least one pound per inch (1.15 kilograms per centimeter) less than the seam strength, the seam strength being greater than about eight pounds per inch (9.2 kilograms per centimeter) width.

7. The polymer membrane of claim 6 wherein (a) the chlorinated polyethylene resin is present in an amount of from about 65 to about 75 parts per 100 parts of polymer blend composition, (b) the first elastomeric copolymer of ethylene is present in an amount of from about 10 to about 25 parts per 100 parts of polymer blend composition and (c) the second elastomeric copolymer of ethylene is present in an amount of from about 15 to about 25 parts per 100 parts of polymer blend composition.

8. The polymer membrane of claim 6 wherein (a) the chlorinated polyethylene resin is present in an amount of from about 68 to about 72 parts per hundred parts per hundred parts of polymer blend composition, (b) the first elastomeric copolymer of ethylene is present in an amount of from about 12 to about 18 parts per hundred parts of polymer blend composition and (c) the second elastomeric copolymer of ethylene is present in an amount of from about 12 to about 18 parts per hundred parts of polymer blend composition.

9. The polymer membrane of claim 6 wherein the first elastomeric copolymer of ethylene has polymerized therein ethylene in an amount of from about 49 to about 60 percent by weight of polymer and vinyl acetate in an amount of from about 40 to about 51 percent by weight of polymer.

10. The polymer membrane of claim 6 wherein the second elastomeric copolymer of ethylene has polymerized therein ethylene in an amount of from about 75 to about 85 percent by weight of polymer and vinyl acetate in an amount of from about 15 to about 25 percent by weight of polymer.

11. The polymer membrane of claim 6 wherein (a) the blocking value is less than about one pound per inch (1.15 kilograms per centimeter) width, (b) the temperature induced load is less than about 10 pounds per inch (11.5 kilograms per centimeter) width and (c) the seam strength is greater than about 15 pounds per inch (17.25 kilograms per centimeter) width.

* * * * *

UNITED STATES PATENT AND TRADEMARK OFFICE
CERTIFICATE OF CORRECTION

PATENT NO. : 4,487,891

DATED : December 11, 1984

INVENTOR(S) : Kim L. Walton et al.

It is certified that error appears in the above-identified patent and that said Letters Patent is hereby corrected as shown below:

Column 1, line 28, a period should follow "thereof". Column 2, line 28, "On" should read --One--; line 46, "9.2" should read --1.43--; line 49, "11.5" should read --1.79--; line 55, "17.25" should read --2.68--; line 59, "8.05 to 17.25" should read --1.25 to 2.68--; and lines 62, 64 and 66, "1.15" should read --0.18--. Column 4, line 51, "17.25" should read --2.68--; and line 53, "11.5" should read --1.79--. Column 6, line 21, "692A" should read --629A--; and line 55 "(b)" should read --(c)--. Column 8, line 14, "centimetes" should read --centimeters--; and line 25, "0.39" should read --0.45--. Column 9, Table II, Example 1, "10.9" should read --1.70--, "9.1" should read --1.41-- and "0.9" should read --0.14--; Comparative Example A, "21.3" should read --3.31--, "12.4" should read --1.93-- and "8.6" should read --1.34--; Comparative Example B, "0.2", both occurrences, should read --0.04-- and "15.1" should read --2.34--; Comparative Example C, "1.5", both occurrences, should read --0.23-- and "14.4" should read --2.23--; Comparative Example D, "1.5" should read --0.23--, "5.0" should read --0.77-- and "15.0" should read --2.32--; and Comparative Example E, "0.7", first occurrence, should read --0.12--, "15.2" should read --2.36-- and "0.7", second occurrence, should read --0.11--. Column 10, Table IV, Example 2, "4.5" should read --0.70--, "21.8" should read --3.40-- and "0.9" should read --0.14--; Example 3, "8.4" should read --1.31--, "9.8" should read --1.52-- and "0.1" should read --0.02--; Comparative Example F, "3.7" should read --0.57--, "23" should read --3.58-- and "28.8" should read --4.47--; Comparative Example G, "11.4" should read --1.77--, "5.2" should read --0.80-- and "0.7" should read --0.11--; Comparative Example H, "4.0" should read --0.62--, "13.2" should read --2.05-- and "13.0" should read --2.02--; line 25, "1.15" should read --0.18--. Column 11, line 15, "0.9" should read --0.14--, "13.2" should read --2.06--, "3.4" should read --0.54-- and "1.2" should read --0.18--; and line 21, "1.15" should

UNITED STATES PATENT AND TRADEMARK OFFICE
CERTIFICATE OF CORRECTION

PATENT NO. : 4,487,891                                    Page 2 of 2
DATED      : December 11, 1984
INVENTOR(S) : Kim L. Walton et al.

It is certified that error appears in the above-identified patent and that said Letters Patent is hereby corrected as shown below:

read --0.18--. Column 12, line 22 "polyme-" should read --polymer--. Column 13, lines 10, 12, and 23 "1.15" should read --0.18--; line 14, "9.2" should read --1.43--; line 25, "11.5" should read --1.78--; and line 26, "17.25" should read --2.68--.

Signed and Sealed this

First Day of October 1985

[SEAL]

Attest:

Attesting Officer

DONALD J. QUIGG

Commissioner of Patents and
Trademarks—Designate